United States Patent
Wada et al.

(10) Patent No.: US 7,151,565 B1
(45) Date of Patent: *Dec. 19, 2006

(54) MONITOR CAMERA CAPABLE OF RECORDING OPERATION HISTORY, AND METHOD OF RECORDING OPERATION HISTORY

(75) Inventors: Jyoji Wada, Yokohama (JP); Koji Wakiyama, Yokohama (JP); Haruo Kogane, Kawasaki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 806 days.

This patent is subject to a terminal disclaimer.

(21) Appl. No.: 09/856,889

(22) PCT Filed: Sep. 27, 2000

(86) PCT No.: PCT/JP00/06671

§ 371 (c)(1),
(2), (4) Date: May 29, 2001

(87) PCT Pub. No.: WO01/24528

PCT Pub. Date: Apr. 5, 2001

(30) Foreign Application Priority Data

Sep. 30, 1999 (JP) .................................. 11-279327

(51) Int. Cl.
H04N 5/76 (2006.01)
(52) U.S. Cl. .................................... 348/231.6; 348/143
(58) Field of Classification Search ................ 348/143, 348/169, 211.11, 211.15, 144, 161; 382/103
See application file for complete search history.

(56) References Cited

U.S. PATENT DOCUMENTS

| 4,827,333 | A | * | 5/1989 | Iwabe ........................ 348/263 |
| 4,945,417 | A |   | 7/1990 | Elberbaum |
| 5,627,616 | A |   | 5/1997 | Sergeant et al. |
| 5,881,321 | A | * | 3/1999 | Kivolowitz .................. 396/53 |
| 5,896,166 | A |   | 4/1999 | D'Alfonso et al. |
| 5,929,904 | A | * | 7/1999 | Uchida ..................... 348/211.7 |
| 6,529,234 | B1 | * | 3/2003 | Urisaka et al. ........ 348/211.99 |
| 6,667,764 | B1 | * | 12/2003 | Wakiyama et al. ...... 348/211.6 |
| 6,803,946 | B1 | * | 10/2004 | Wakiyama et al. ...... 348/211.6 |

FOREIGN PATENT DOCUMENTS

| EP | 0 737 005 | 10/1996 |
| EP | 0 938 227 | 8/1999 |
| JP | 63-25708 | 2/1988 |
| JP | 4-18888 | 1/1992 |
| JP | 6-62285 | 3/1994 |
| JP | 7-114678 | 5/1995 |
| JP | 8-111838 | 4/1996 |
| JP | 11-242523 | 9/1999 |
| JP | 2000-32438 | 1/2000 |
| JP | 2000032438 | * 1/2000 |

* cited by examiner

Primary Examiner—Vivek Srivastava
Assistant Examiner—Gevell Selby
(74) Attorney, Agent, or Firm—Pearne & Gordon LLP (57) ABSTRACT

A storage means (47) formed of a rewritable non-volatile memory for recording the operation history of the surveillance camera is provided within the surveillance camera apparatus. An auto panning operation time, a power supply turn-on time, a temperature within the surveillance camera apparatus, the number of preset operations, the number of changing operations of the filter of the camera or the number of a coordinate system resetting operations is recorded, whereby important information at the time of repairing can be provided.

7 Claims, 13 Drawing Sheets

PRESET POSITION

| ID | PAN | TILT | ZOOM | FOCUS |
|---|---|---|---|---|
| 1 | $P_1$ | $T_1$ | $Z_1$ | $F_1$ |
| 2 | $P_2$ | $T_2$ | $Z_2$ | $F_2$ |
| 3 | $P_3$ | $T_3$ | $Z_3$ | $F_3$ |
| ⋮ | ⋮ | ⋮ | ⋮ | ⋮ |

MONITOR CAMERA CAPABLE OF RECORDING OPERATION HISTORY, AND METHOD OF RECORDING OPERATION HISTORY

TECHNICAL FIELD

The present invention relates to a surveillance camera apparatus and a method of recording the operation history thereof, which in particular makes it possible to record the operation history so as to make use of repair etc.

BACKGROUND ART

Conventionally, surveillance cameras in each of which a camera and a turntable of the camera are housed within a dome-shaped housing have been on the market. Such a camera is called as a composite camera since both the rotation of the camera in the horizontal direction (panning) and the rotation of the camera in the vertical direction (tilting) can be performed due to the operation of the turntable. The conventional composite camera is able to rotate by 360 degrees to the panning direction endlessly and also able to rotate by 0 to 90 degrees to the tilting direction, that is, from the horizontal direction to the vertical direction.

The group of the inventors of the invention have improved such a composite camera to develop a new composite camera that can rotate by 360 degrees to the panning direction endlessly and rotate by 180 degrees to the tilting direction. This new composite camera can move to a target camera position through the shortest path since the degree of freedom of the moving direction is increased.

Figure 9:
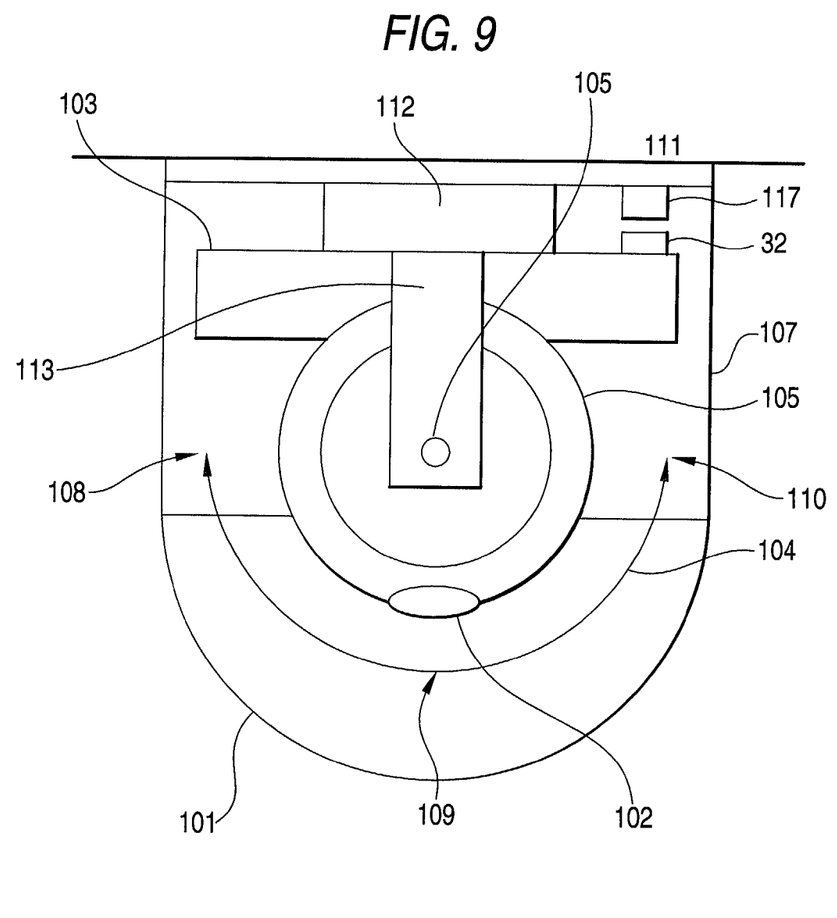
FIG. 9 is a sectional side view showing the configuration of the composite camera.
Figure 10:
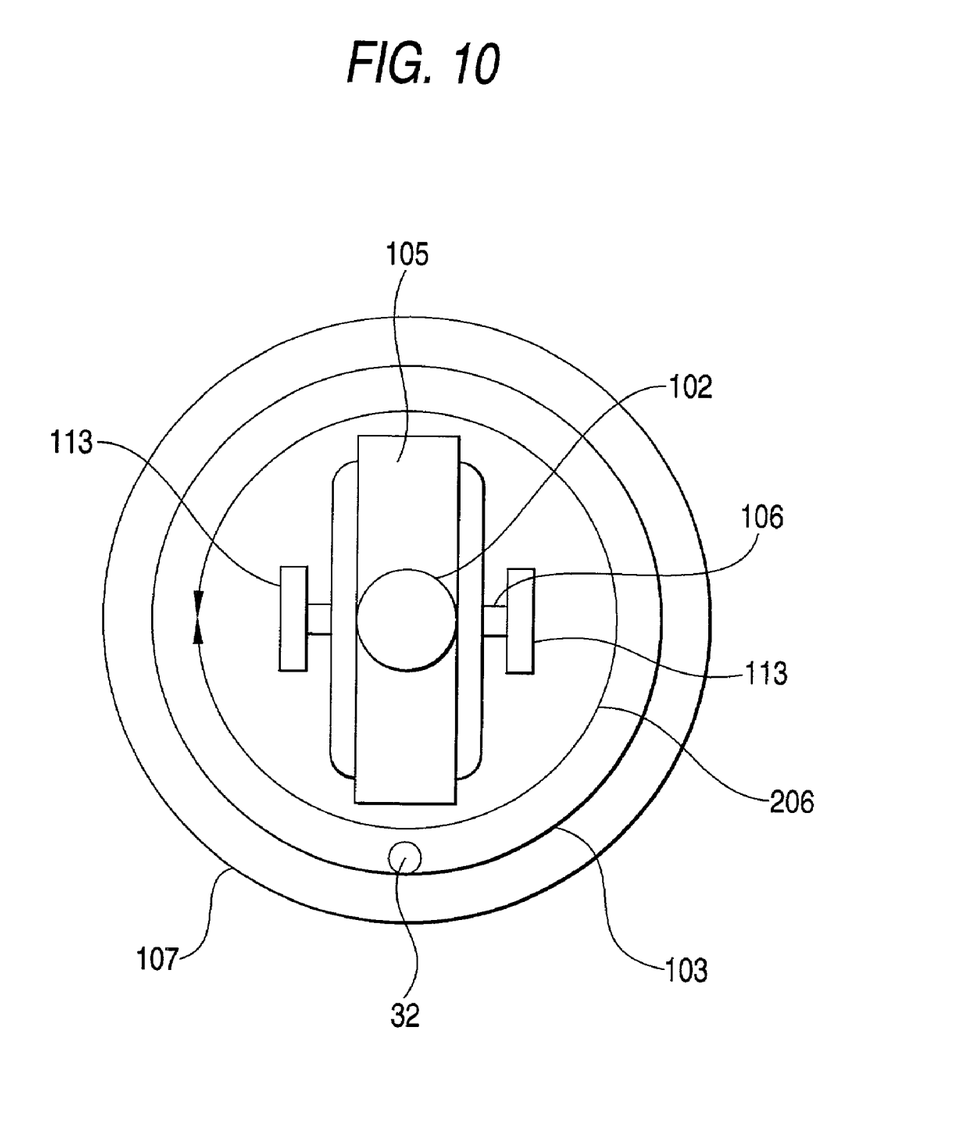
FIG. 10 is a sectional plan view showing the configuration of the composite camera.

As shown in the side sectional view of FIG. 9 and the plan view of FIG. 10, the composite camera includes, within a housing constituted by a cylindrical camera base 107 and a hemispherical camera cover, a surveillance camera 102, a tilting turntable 105 for directly holding the camera 102, a panning turntable 103 capable of rotating endlessly by 360 degrees, a pair of columns 113 provided at the panning turntable 103 so as to elect therefrom, a tilting rotation shaft 106 for pivotally supporting the tilting turntable 105 to the columns 113, and a slip spring 112 acting as a contact for supplying the electric power within the housing and inputting/outputting an electric signal. Although not shown, the composite camera further includes a rotation mechanism for the panning turntable 103 and the tilting turntable 104, a motor serving as the driving source for the rotation, a driving control unit for the motor, an amplifying circuit for amplifying an image signal, and a control unit for controlling the operation of the composite camera, etc. Further, in order to determine the rotation origin point of the panning direction, a magnet 117 is fixed at the origin position of the housing and the panning turntable 103 is provided with an origin hall element 32 for detecting the magnetic field of the magnet 117.

The tilting turntable 105 for holding the camera 102 is able to rotate over 180 degrees around the tilting rotation shaft 106. Thus, the camera 102 can reciprocally turn from a point A (108) to a point C (110) through a lowest point B (109) as shown in FIG. 9.

The panning turntable 103 can rotate over 360 degrees in the horizontal direction as shown by a rotation locus 206 in FIG. 10.

The slip ring 112 realizes the power supply from a fixing portion to a movable portion and the conduction of the electric signal between the fixing portion and the movable portion.

Thus, when this composite camera is attached to the ceiling, then the rotation angle of the tilting turntable 105 is adjusted by the remote control and the panning turntable 103 is rotated to the predetermined angle, the camera 102 can photograph all the direction of the surveillance area.

Figure 11:
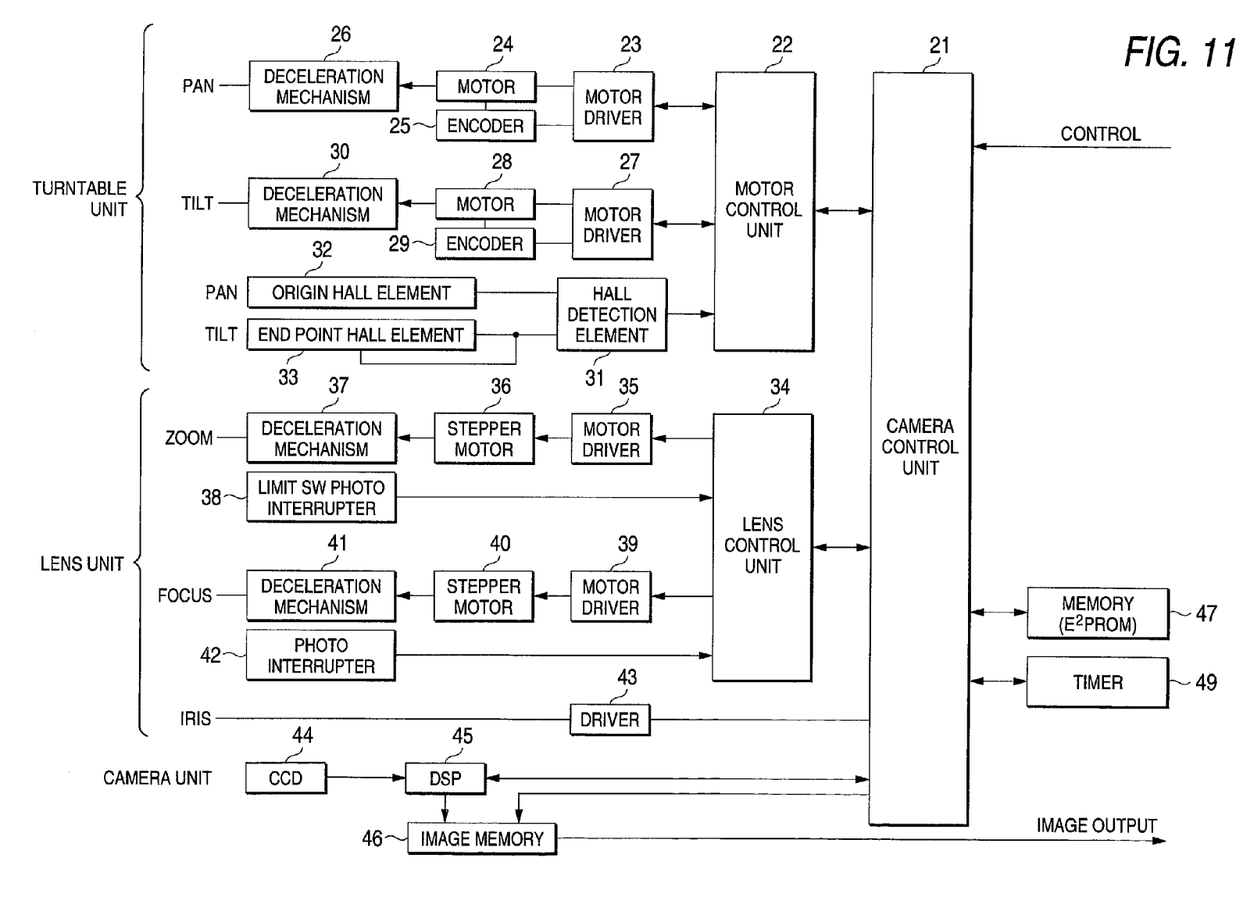
FIG. 11 is a block diagram showing the configuration of the composite camera.

FIG. 11 is a functional block diagram showing the internal configuration of this composite camera. As the rotation control mechanism for the panning turntable 103 and the tilting turntable 105, the composite camera includes rotating motors 24, 28; encoders 25, 29 for detecting the revolution numbers of the motors 24, 28, respectively; motor drivers 23, 27 for driving the motors 24, 28 based on the detection results, respectively; deceleration mechanisms 26, 30 for decelerating the rotation velocities of the motors 24, 28 and transmitting the decelerated rotation forces to the panning turntable 103 and the tilting turntable 105, respectively; the origin hall element 32 disposed on the panning turntable 103 and responsive to the magnetic field of a magnet 117 disposed at the origin of the punning operation; end point hall elements 33 disposed at the tilting turntable 105 so as to separate by 180 degrees to each other and responsive to the magnetic fields of magnets disposed at the end points of the tilting operation; a hall element detection unit 31 for detecting the origin of the panning operation and the end points of the tilting operation from the detection signals of the hall elements 32, 33; and a motor control unit 22 for controlling the motor drivers 23, 27 based on the detection result of the hall element detection unit 31.

Further, as the control mechanism for a camera lens unit, the composite camera includes stepper motors 36, 40 for adjusting zooming and focusing operations, respectively; motor drivers 35, 39 for outputting driving pulses to the stepper motors 36, 40, respectively; deceleration mechanisms 37, 41 for decelerating the rotation velocities of the stepper motors 36, 40 and transmitting the decelerated rotation forces to the lens mechanism; a limit switch or a photo interrupter 38 for detecting the limit of the zooming adjustment; a photo interrupter 42 for detecting the limit of the focusing adjustment; a lens control unit 34 for controlling the motor drivers 35, 39; and a driver 43 for adjusting an iris.

Further, as a camera unit for outputting an image signal, the composite camera includes a CCD 44 for photographing images, a DSP 45 for coding the image signal, and an image memory 46 for writing and reading image data.

Furthermore, the composite camera includes a camera control unit 21 for controlling the operation of the composite camera based on a control signal inputted from a controller, a memory ($E^2PROM$) 47 for storing data and a timer 49 for counting time.

Figure 12:
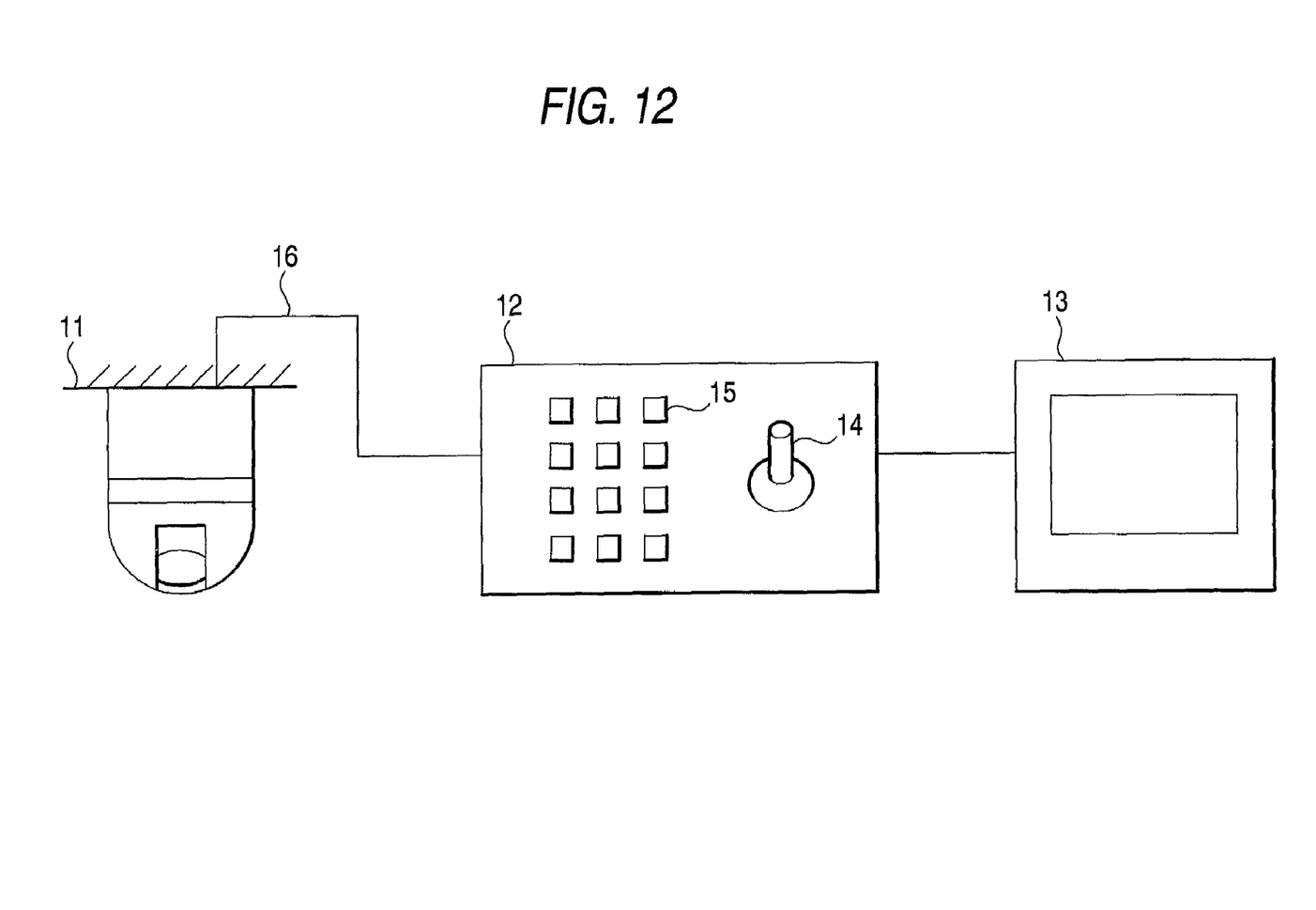
FIG. 12 is a diagram showing a controller for controlling the composite camera.
Figure 13:
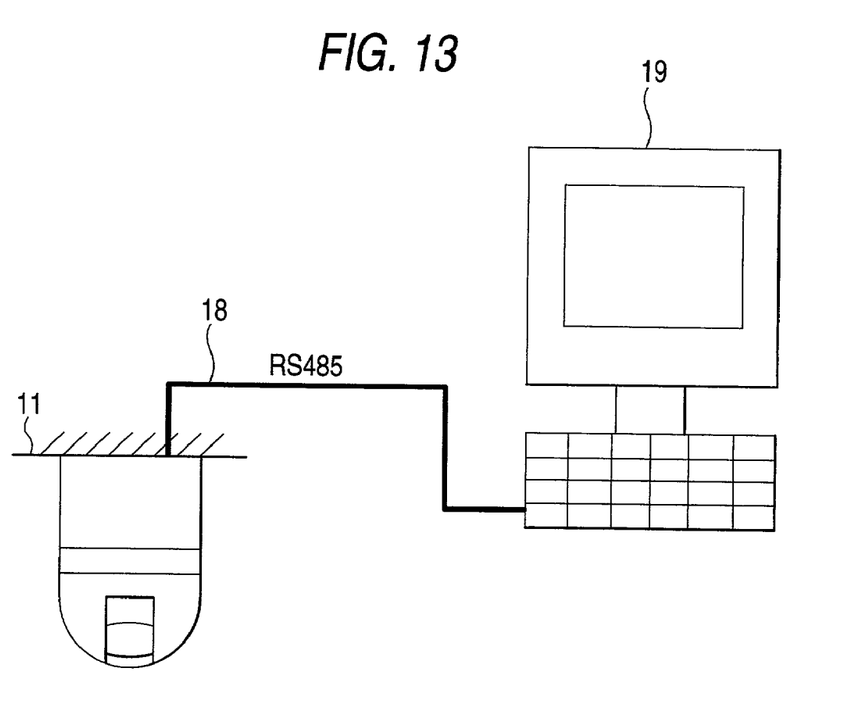
FIG. 13 is a diagram showing a personal computer for controlling the composite camera.

As shown in FIG. 12, the composite camera is connected to the controller 12 and a monitor 13 through a coaxial cable 16. Alternatively, as shown in FIG. 13, the composite camera is connected to a personal computer 19 through an RS485 cable serving as a communication transmitting means and controlled thereby.

Although, these drawings show the case where the single composite camera 11 is coupled to the controller 12 or the personal computer 19, a plurality of the composite cameras may be coupled to the controller 12 or the personal computer 19 so that these composite cameras are controlled thereby.

In this composite camera, the output pulses of the encoder 25 for detecting the rotation of the motor 24 in the panning direction are transmitted to the motor control unit 22, and the detection timing of the origin of the panning operation detected by the origin hall element 32 is transmitted to the motor control unit 22 through the hall element detection unit

31. Supposing that the encoder 25 outputs p pulses while the panning turntable rotates by one revolution, the motor control unit 22 counts m pulses outputted from the encoder 25 after the origin hall element 32 detects the origin of the panning operation to thereby calculate a current panning angle Pt based on an expression of Pt=m×360/p. The current panning angle Pt thus calculated is held in a storage area (RAM) of the camera control unit 21.

Similarly, the output pulses of the encoder 29 for detecting the rotation of the motor 28 in the tilting direction are transmitted to the motor control unit 22, and also the detection timing of the end point of the tilting operation detected by the end point hall element 33 is transmitted to the motor control unit 22 through the hall element detection unit 31. Supposing that the encoder 29 outputs q pulses while the tilting turntable rotates by a half revolution, the motor control unit 22 counts n pulses outputted from the encoder 29 after the end point hall element 33 detects the end point of the tilting operation to thereby calculate a current tilting angle $T_t$ based on an expression of $T_t$=90−(n×180/q). That is, the tilting angle is calculated in a manner that the beneath direction is 0 degree. The range of the tilting angle is in a range of +90 degrees to −90 degrees. The current tilting angle $T_t$ thus calculated is held in the RAM.

The view angle of an image photographed by the lens unit is determined by the rotation amount of the stepper motor 36 for defining the zooming amount, and the rotation amount is determined by the number of pulses outputted to the stepper motor 36. Similarly, the focal distance of the lens unit is determined by the number of the pulses outputted to the stepper motor 40. The lens control unit 34 counts up the pulses outputted for rotating the stepper motors 36, 40 in the positive direction and counts down the pulses outputted for rotating the stepper motors in the negative direction to thereby accumulate the numbers of pulses outputted from the motor drivers 35, 39, respectively. These accumulated numbers of the pulses are held in the RAM as data representing the current view angle $Z_t$ and the current focal distance $F_t$.

In this manner, $P_t$, $T_t$, $Z_t$ and $F_t$ are held in the RAM as the data representing the current status amounts of the composite camera.

In the case of controlling the operation of the composite camera, the controller 12 of FIG. 12 or the personal computer 19 of FIG. 13 transmits a command to the composite camera. The camera control unit 21 of the composite camera 11 interprets the received command to control the operations of the respective units thereof.

For example, in the case of setting a preset position, an operator operates the controller 12 to remotely control the direction of the camera to thereby direct the camera position of the composite camera 11 toward a target preset position.

Figure 14:
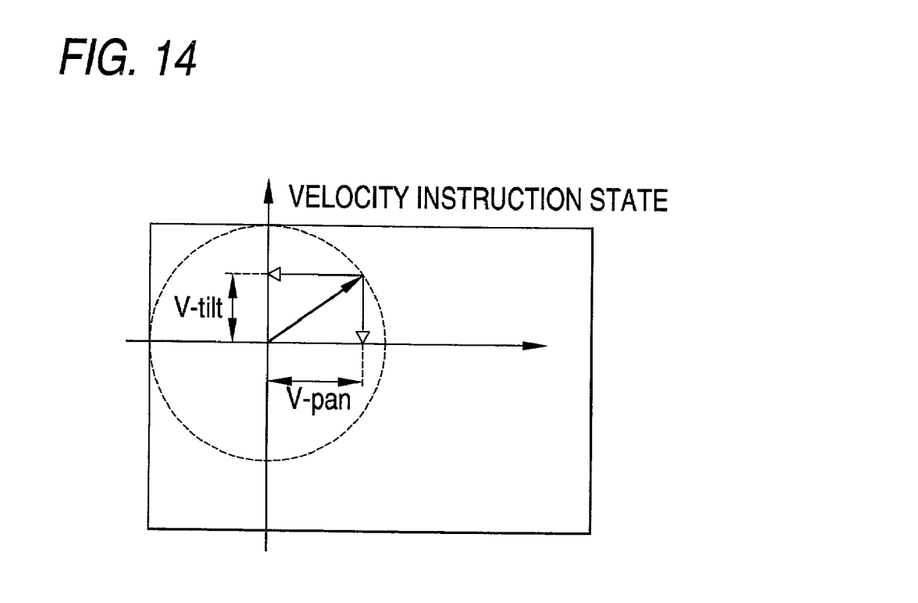
FIG. 14 is a diagram for explaining the velocity control of the composite camera using a joy stick of the controller.

When the operator inclines the joystick 14 of the controller 12 in order to change the direction of the camera, in response to this operation, the controller 12 transmits to the composite camera 11 data $V_{pan}$ representing the X-axis component and data $V_{tilt}$ representing the Y-axis component of the slanted joystick 14 as shown in FIG. 14 together with a command for instructing the velocity control of the camera. The camera control unit 21 of the composite camera 11 interprets the received command and sends the data $V_{pan}$ and the data $V_{tilt}$ to the motor control unit 22, whereby the motor control unit 22 controls the motor driver 23 so as to perform the panning rotation at the velocity of $V_{pan}$ and also controls the motor driver 27 so as to perform the tilting rotation at the velocity of $V_{tilt}$.

When the operator moves the joystick back to a neutral position, in the similar manner as described above, data $V_{pan}$=0 and data $V_{tilt}$=0 are sent to the composite camera together with a command, whereby both the rotation in the tilting direction and the rotation in the panning direction is stopped.

As described above, when the camera changes its direction, the data $P_t$, $T_t$, $Z_t$ and $F_t$ representing the current status amount of the camera are updated and held in the RAM.

When the operator confirms on the monitor screen that the composite camera 11 is directed to the target direction, the operator remotely operates the zoom amount as the need arises and thereafter inputs the instruction of the presetting and the ID of the preset position by means of the controller 12 or the personal computer 19. The presetting instruction command including the ID is sent to the composite camera 11. The camera control unit 21 interprets this command and stores the data $P_t$, $T_t$, $Z_t$ and $F_t$ representing the current status amounts of the composite camera in the memory 47 together with the ID.

Figure 15:
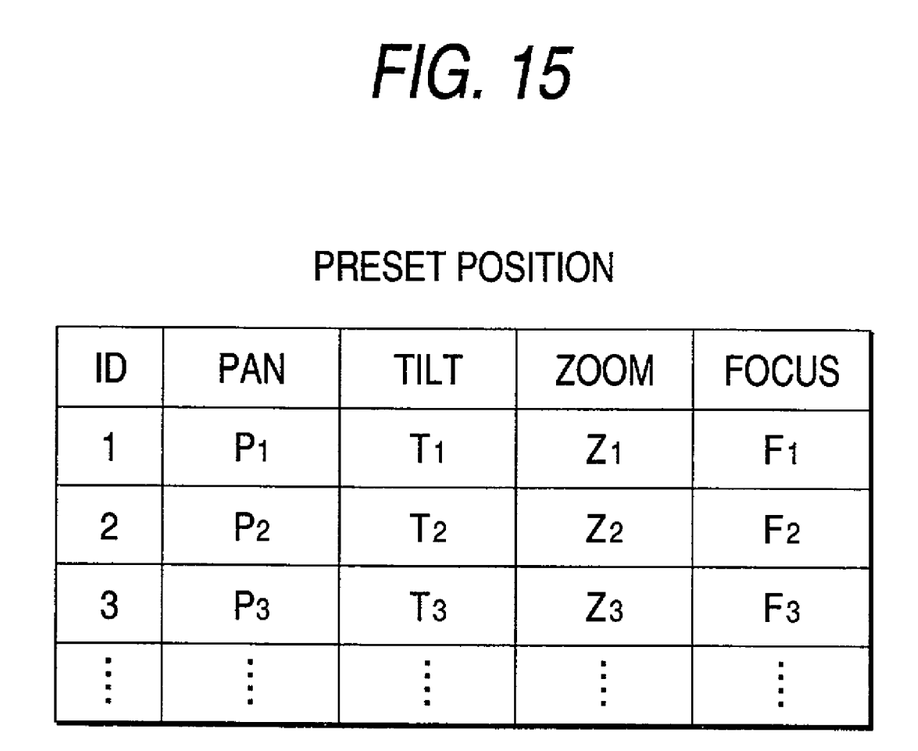
FIG. 15 is a diagram showing data representing status amounts of preset positions stored in the composite camera.

Such operations are repeatedly performed to thereby set a plurality of preset positions in the memory 47 as shown in FIG. 15.

Then, in the case where the operator operates the controller 12 or the personal computer 19 to designate the ID (for example, ID=2) of the preset position to thereby instruct the photographing at the preset position, the camera control unit 21 of the composite camera 11 interprets the received command, then reads the data $P_2$, $T_2$, $Z_2$ and $F_2$ representing the status amounts of the preset position of ID=2 from the memory 47 and compares these status amounts with the data representing the current status amounts $P_t$, $T_t$, $Z_t$ and $F_t$ stored in the RAM to obtain the shortest path from the current camera position to the preset position of ID=2. Then, the camera control unit instructs the motor control unit 22 so as to perform the panning rotation by a required panning rotation angle and also perform the tilting rotation by a required tilting rotation angle. Further, the camera control unit instructs the lens control unit 34 to output pulses of ($Z_2$−$Z_t$) to the zooming stepper motor 36 and to output pulses of ($F_2$−$F_t$) to the focusing stepper motor 36.

The motor driver 23 rotates the motor 24 by the panning rotation angle instructed through the motor control unit 22 and stops the rotation of the motor 24 when the detection is made based on the output from the encoder 25 that the motor 24 has rotated by the instructed rotation angle. Similarly, the motor driver 27 rotates the motor 28 by the tilting rotation angle instructed through the motor control unit 22 and stops the rotation of the motor 28 when the detection is made based on the output from the encoder 29 that the motor 28 has rotated by the instructed rotation angle. As a result, the camera is directed to the preset position of ID=2 and starts the photographing in the lens state at the time of the presetting. Incidentally, the iris is adjusted by activating the driver 43 in accordance with the brightness of a subject to be photographed at that time.

The CCD 44 photographs an image to which the camera is directed. An image signal from the CCD is coded by the DSP 45 and stored in the image memory 46. Then, the image signal thus coded is read from the image memory 46 and outputted to the monitor 13.

It is possible to have the composite camera storing a plurality of preset positions perform the surveillance operation for automatically monitoring the respective preset positions sequentially, that is, the auto tracing operation.

Further, it is possible to have the composite camera perform the automatic panning operation for continuously photographing while performing the panning rotation automatically at a constant velocity.

When the hall element detection unit 31 detects the origin of the panning operation or the endpoint of the tilting operation during the panning rotation or the tilting rotation, the camera control unit 21 refers to the current status amount $P_t$ or $T_t$ of the composite camera held in the memory to thereby reset (reset of the coordinate system) the $P_t$ or $T_t$ to a correct value when the value of the $P_t$ corresponding to the origin is not 0 or when the value of the $T_t$ upon detecting the end point of the tilting operation is not 90 degrees.

Furthermore, this composite camera can photograph color images at the daytime and also photograph black-and-white images at the night. In this case, color images can be photographed by attaching an IR (infrared ray) filter for suppressing the infrared rays to the camera, whilst black-and-white images can be photographed by removing the IR filter in order to raise the sensitivity. The attaching and removing operation of the IR filter can be performed mechanically by using a motor.

However, according to such an apparatus which can perform such complicated operations and cope with various usages of users, if the apparatus becomes failure, it is difficult to determine a cause of the failure. Thus, in most cases, the apparatus thus failed can not be repaired immediately even when a service man go to the site.

Accordingly, the invention is intended to solve the aforesaid conventional problems and an object of the invention is to provide a surveillance camera and a method of recording operation history there of which can record the operation history of the composite camera and remain information important for repairing the camera.

DISCLOSURE OF THE INVENTION

Accordingly, the invention provides, within a surveillance camera apparatus, a storage means formed of a rewritable non-volatile memory for recording the operation history of a surveillance camera.

Further, according to the invention, a method of recording operation history of the surveillance camera apparatus into the rewritable non-volatile memory within the surveillance camera apparatus is arranged in a manner that a status amount to be recorded is obtained at a constant time interval T1, then a status amount stored in a temporary storage means is updated based on the obtained status amount, and the status amount recorded in the temporary storage means is recorded in the non-volatile memory at a time interval T2 which is longer than the T1.

Further, upon each time a status to be recorded is generated, a generation number of the status recorded in the non-volatile memory is incremented by one.

In this manner, since the operation history is held, important information at the time of repairing can be provided.

Further, according to the method of recording the status amount, an auto panning operation time, a power supply turn-on time or a temperature within the surveillance camera apparatus can be recorded. Furthermore, according to the method of recording the generation number of the status, the number of preset operations, the number of changing operations of the filter of the camera or the number of coordinate system resetting operations can be recorded.

In the drawings, a reference numeral 10 denotes a camera; 11 a composite camera; 12 a controller; 13 a monitor; 14 a joy stick; 15 ten keys; 21 a camera control unit; 22 a motor control unit; 23, 27 motor drivers; 24, 28 motors; 25, 29 encoders; 26, 30 deceleration mechanisms; 31 a hall element detection unit; 32 an origin hall element; 33 end point hall elements; 34 a lens control unit; 35, 39 motor drivers; 36, 40 stepper motors; 37, 41 deceleration mechanisms; 38 a limit switch/photo interrupter; 42 a photo interrupter; 43 a driver; 44 a CCD; 45 a DSP; 46 an image memory; 47 a memory ($E^2$PROM); 49 a timer; 50 a RAM; 51 a temperature sensor; 52 an IR changing unit; 53 a counter; 54 a power supply unit; 61 a terminal device; 102 a camera; 103 a panning turntable; 105 a tilting turntable; 106 a tilting rotation shaft; 107 a camera base; 112 a slip ring; 113 columns; and 117 a magnet.

BEST MODE FOR CARRYING OUT THE INVENTION

Figure 1:
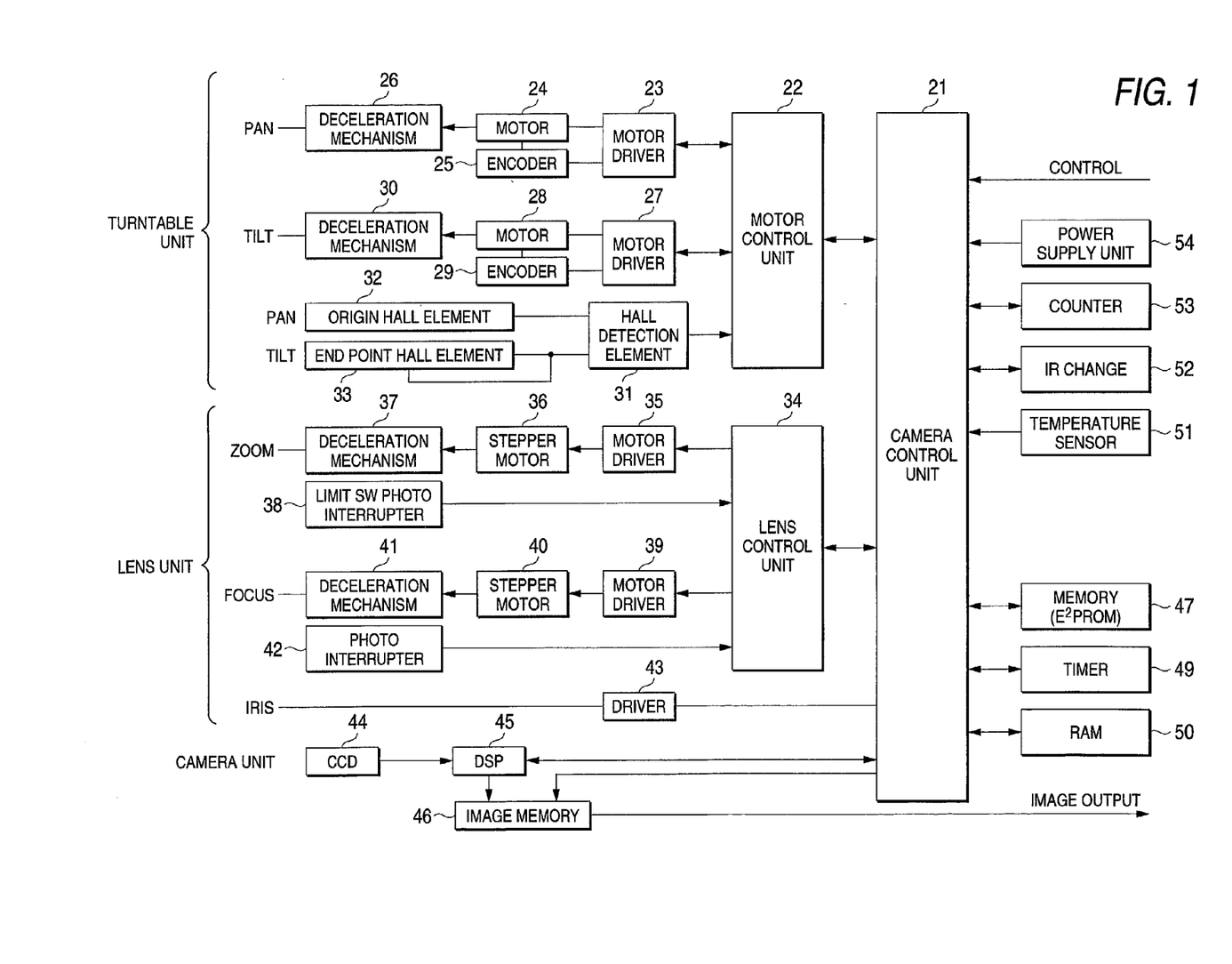
FIG. 1 is a block diagram showing the configuration of a composite camera according to an embodiment of the invention.

FIG. 1 shows the inner configuration of the composite camera according to the embodiment. The inner configuration differs from the block configuration shown in FIG. 11 in a point that the temperature sensor 51 for detecting the temperature within a camera casing is further provided and that the IR changing unit 52 for changing the IR filter and the power supply unit 54 for distributing electric power supplied are clearly shown together with the RAM 50 serving as the working area of the camera control unit 21 and the counter 53 representing the calculation function of the camera control unit 21.

This composite camera records, as the history representing the operation status, the number of automatically tracing of the preset position (number of preset operations) based on the instruction from an operator, an operation time of the automatic panning, a turn-on time of the power supply, the number of IR changing operations for changing the IR filter, the number of resetting operations of the coordinate system each of which resets the stored panning angle or the stored tilting angle at the time of passing the origin or the end point, and the maximum and minimum temperatures within the camera casing.

Since such an operation history is used to grasp the tendency of the operation of the composite camera at the time of repairing, the history is not required to be strictly accurate and so it is necessary not to make a load for collecting the operation data large.

Figure 2:
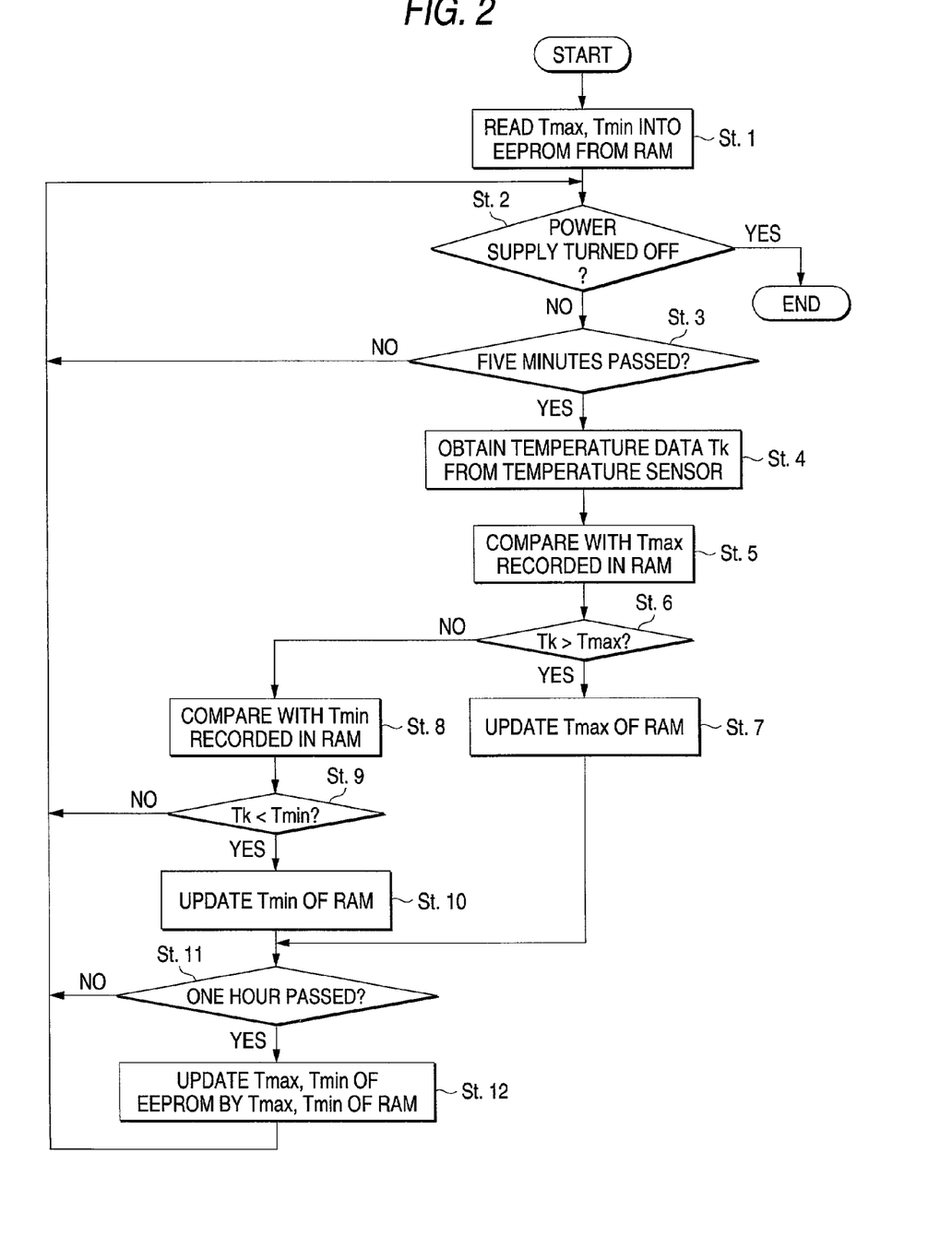
FIG. 2 is a flow chart showing the procedure of recording the maximum and minimum temperatures according to the embodiment.

FIG. 2 shows the operation procedure in the case of recording the maximum and minimum temperatures within the camera casing.

Step 1: the camera control unit 21 reads into the RAM 50 the maximum temperature ($T_{max}$) and the minimum temperature ($T_{min}$) within the camera casing recorded in the E²PROM 47.

Step 2: the operation is stopped immediately upon turn-off of the power supply.

Step 3: upon each lapse of five minutes, step 4: temperature data $T_k$ is obtained from the temperature sensor 51 and step 5: compared with the maximum temperature ($T_{max}$) recorded in the RAM 50.

Step 6: when an expression of $T_k > T_{max}$ is satisfied, step 7: $T_{max}$ recorded in the RAM 50 is updated by $T_k$.

When the expression of $T_k > T_{max}$ is not satisfied in step 6, step 8: $T_k$ is compared with the minimum temperature ($T_{min}$) recorded in the RAM 50.

Step 9: when an expression of $T_k < T_{min}$ is satisfied, step 10: $T_{min}$ recorded in the RAM 50 is updated by $T_k$.

When the expression of $T_k < T_{min}$ is not satisfied in step 9, the process returns to step 2.

Step 11: upon each lapse of one hour, step 12: $T_{max}$ and $T_{min}$ recorded in the E²PROM 47 are updated by $T_{max}$ and $T_{min}$ recorded in the RAM 50, respectively, and the process returns to step 2.

In this manner, the measured temperature of the temperature sensor 51 is checked at every interval of five minutes and the maximum or minimum temperature is recorded in the RAM 50 when the maximum or minimum temperature is updated. The data recorded in the RAM 50 is recorded in the E²PROM 47 at every interval of one hour. The data is recorded in the E²PROM 47 is not erased even when the power supply is turned off unlike the data stored in the RAM 50. Thus, the data recorded in the E² PROM 47 is remained as the operation history.

The time lag between the data recorded in the RAM 50 and the data recorded in the E²PROM 47 is one hour at the maximum and 0 hour at the minimum, so that the data of the maximum and minimum temperatures within at least one hour is surely remained as the history. When the period of rewriting data into the E²PROM 47 is made shorter, the maximum time lag can be made shorter. However, in this case, the frequency of rewriting data into the E²PROM increases in correspondence with the shortage of the period, so that the load of the rewriting work increases. The period of rewriting data into the E²PROM 47 is determined in view of the balance between the rewriting period and the rewriting frequency.

Figure 3:
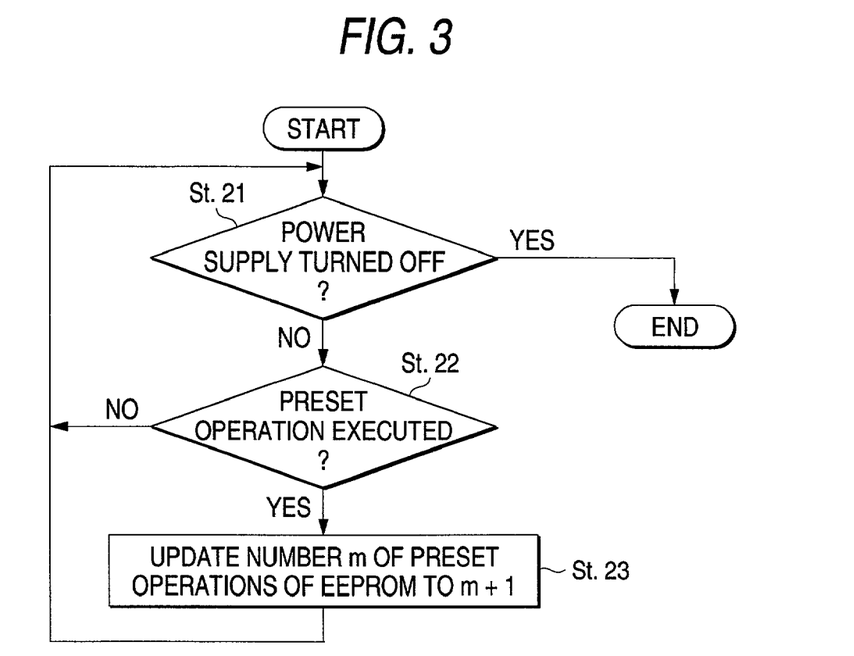
FIG. 3 is a flow chart showing the procedure of recording the history of the number of preset operations according to the embodiment.

FIG. 3 shows the operation procedure of the camera control unit 21 in the case of recording the number of the preset operations.

Step 21: the recording operation is stopped immediately upon turn-off of the power supply.

Step 22: when the preset operation is executed, step 23: the camera control unit 21 increases the number of the preset operations recorded in the E²PROM 47 by one and then the process returns to step 21.

In this manner, the number of the execution of the preset operations is recorded in the E²PROM 47 as the history.

Figure 4:
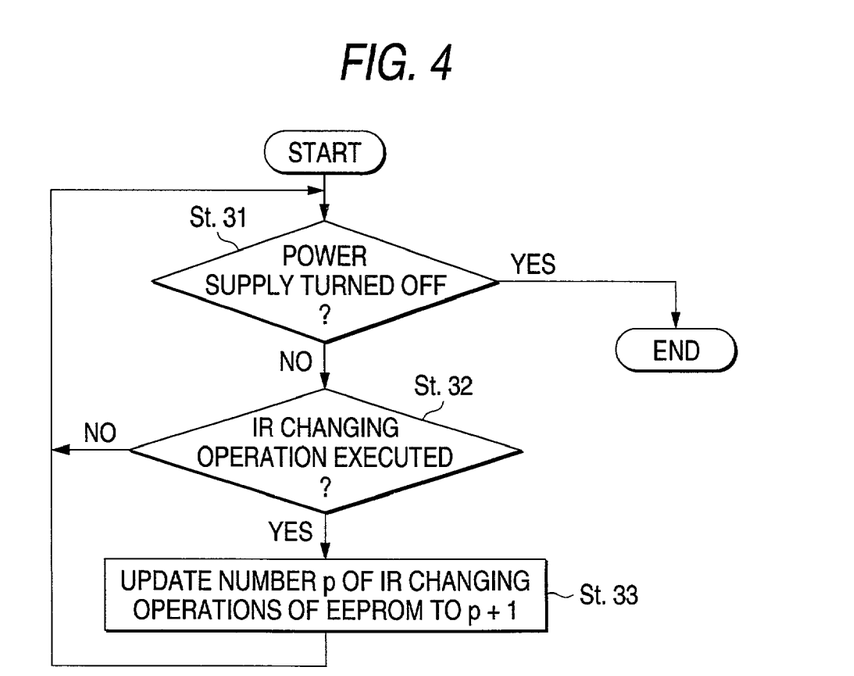
FIG. 4 is a flow chart showing the procedure of recording the history of the number of IR changing operations according to the embodiment.

FIG. 4 shows the operation procedure of the camera control unit 21 in the case of recording the number of the IR changing operations.

Step 31: the recording operation is stopped immediately upon turn-off of the power supply.

Step 32: when the IR changing unit 52 changes the IR filter, step 33: the camera control unit 21 increases the number of the IR changing operations recorded in the E²PROM 47 by one and then the process returns to step 31.

In this manner, the number of the execution of the IR changing operations is recorded in the E²PROM 47 as the history.

Figure 5:
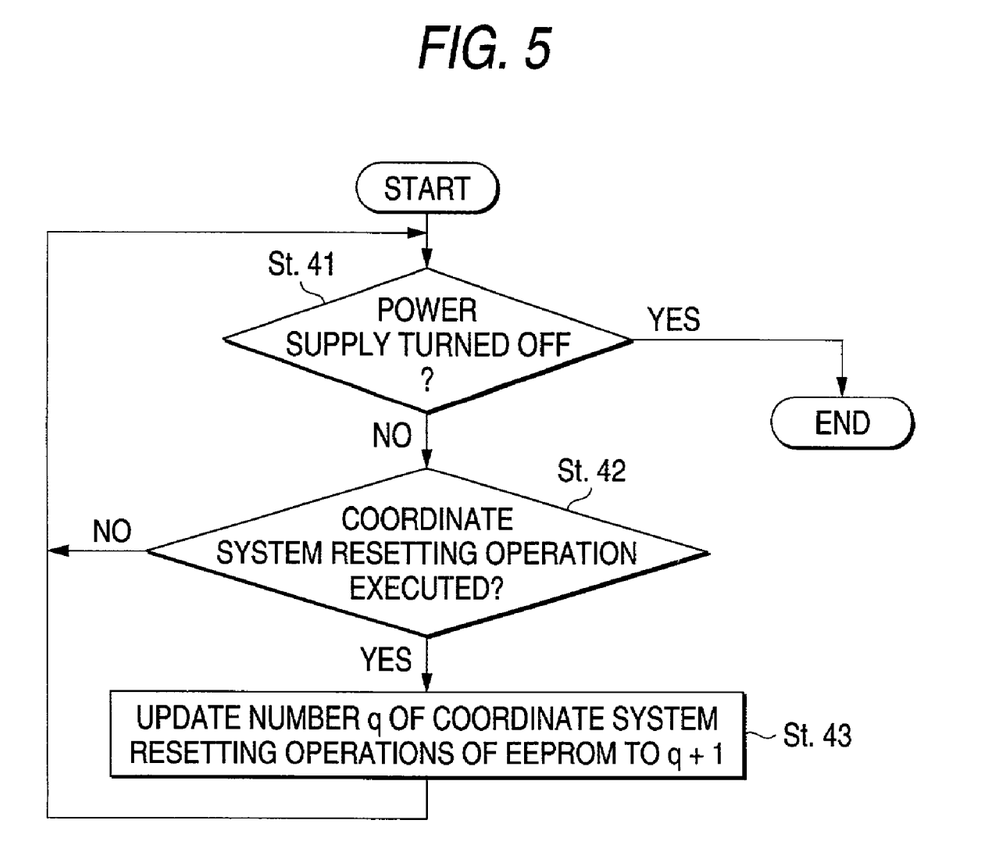
FIG. 5 is a flow chart showing the procedure of recording the history of the number of coordinate-system resetting operations according to the embodiment.

FIG. 5 shows the operation procedure of the camera control unit 21 in the case of recording the number of the coordinate system resetting operations.

Step 41: the recording operation is stopped immediately upon turn-off of the power supply.

Step 42: when the current status amounts $P_t$, $T_t$ of the composite camera are reset to the correct values in compliance with the detection of the origin of the panning operation or the end point of the tilting operation during the panning rotation or the tilting rotation, step 43: the camera control unit 21 increases the number of the coordinate system resetting operations recorded in the E²PROM 47 by one and then the process returns to step 41.

In this manner, the number of the execution of the coordinate system resetting operations is recorded in the E²PROM 47 as the history. In this respect, it is suggested that the degree of the fluctuation of the origin becomes larger as the number of the coordinate system resetting operations increases.

Figure 6:
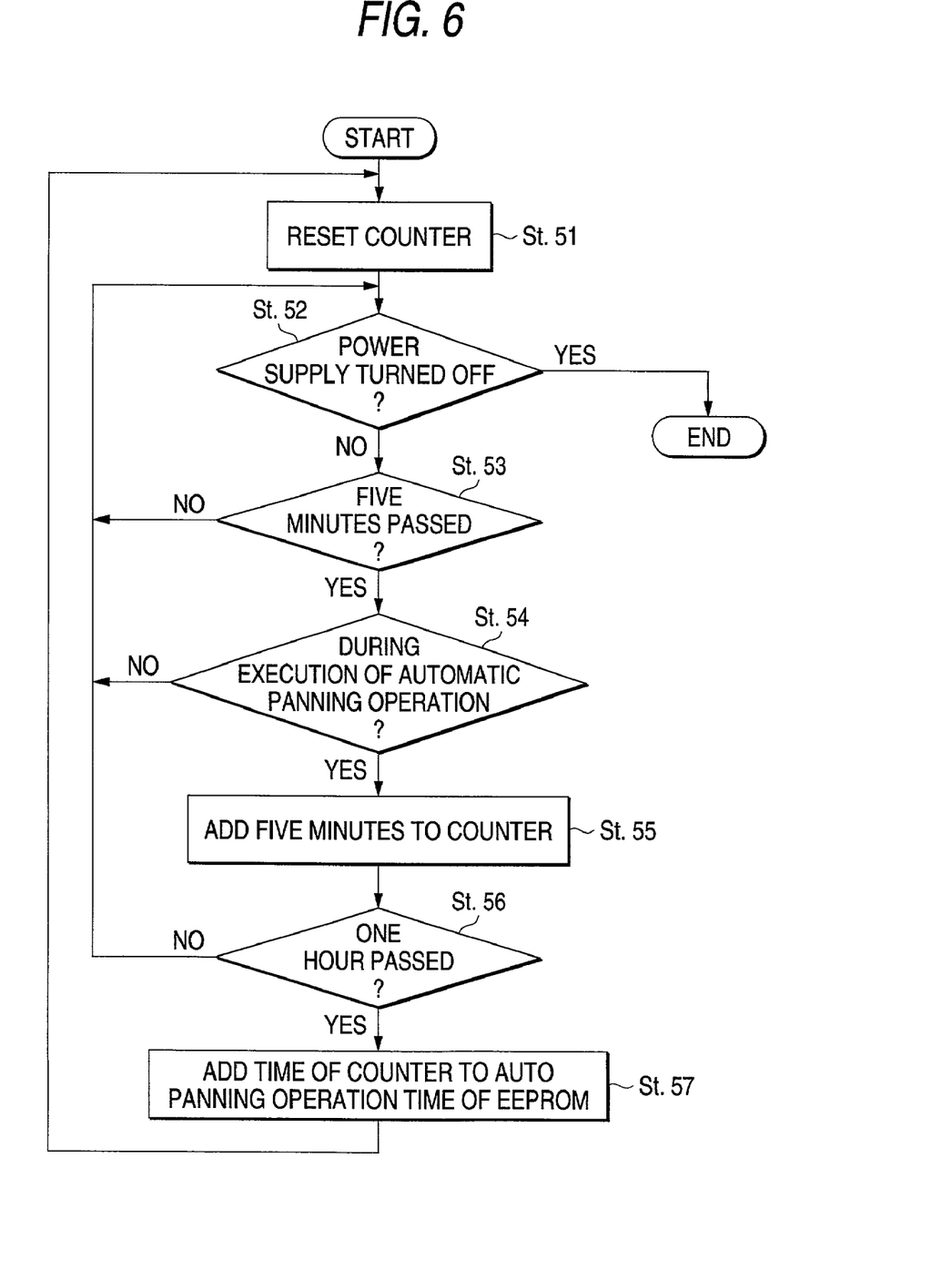
FIG. 6 is a flow chart showing the procedure of recording the history of the times of auto panning operations according to the embodiment.

FIG. 6 shows the operation procedure of the camera control unit 21 in the case of recording the times of the automatic panning operations.

Step 51: the counter 53 is reset.

Step 52: the recording operation is stopped immediately upon turn-off of the power supply.

Step 53: upon each lapse of five minutes, step 54: it is checked whether or not the auto panning operation is being executed at this time.

Step 55: when the automatic panning operation is being executed, five minutes is added to the contents of the counter 53.

Step 56: upon each lapse of one hour, step 57: the time of the counter 53 is added to the automatic panning operation time recorded in the E²PROM 47. Then, the process returns to step 51 to reset the counter 53.

In this manner, the execution of the automatic panning operation is checked at every interval of five minutes. When the automatic panning operation is being executed at that time, it is determined that the automatic panning operation has been executed for five minutes and this time is accumulated to the automatic panning operation time to thereby count the accumulated time by the counter 53. The auto panning operation time counted by the counter 53 is added to the recorded data of the E²PROM 47 at every interval of one hour and the updated automatic panning operation time is held in the E²PROM 47. Thus, the data representing the accumulated time of the automatic panning operations is recorded as the history with the time lag within one hour.

Figure 7:
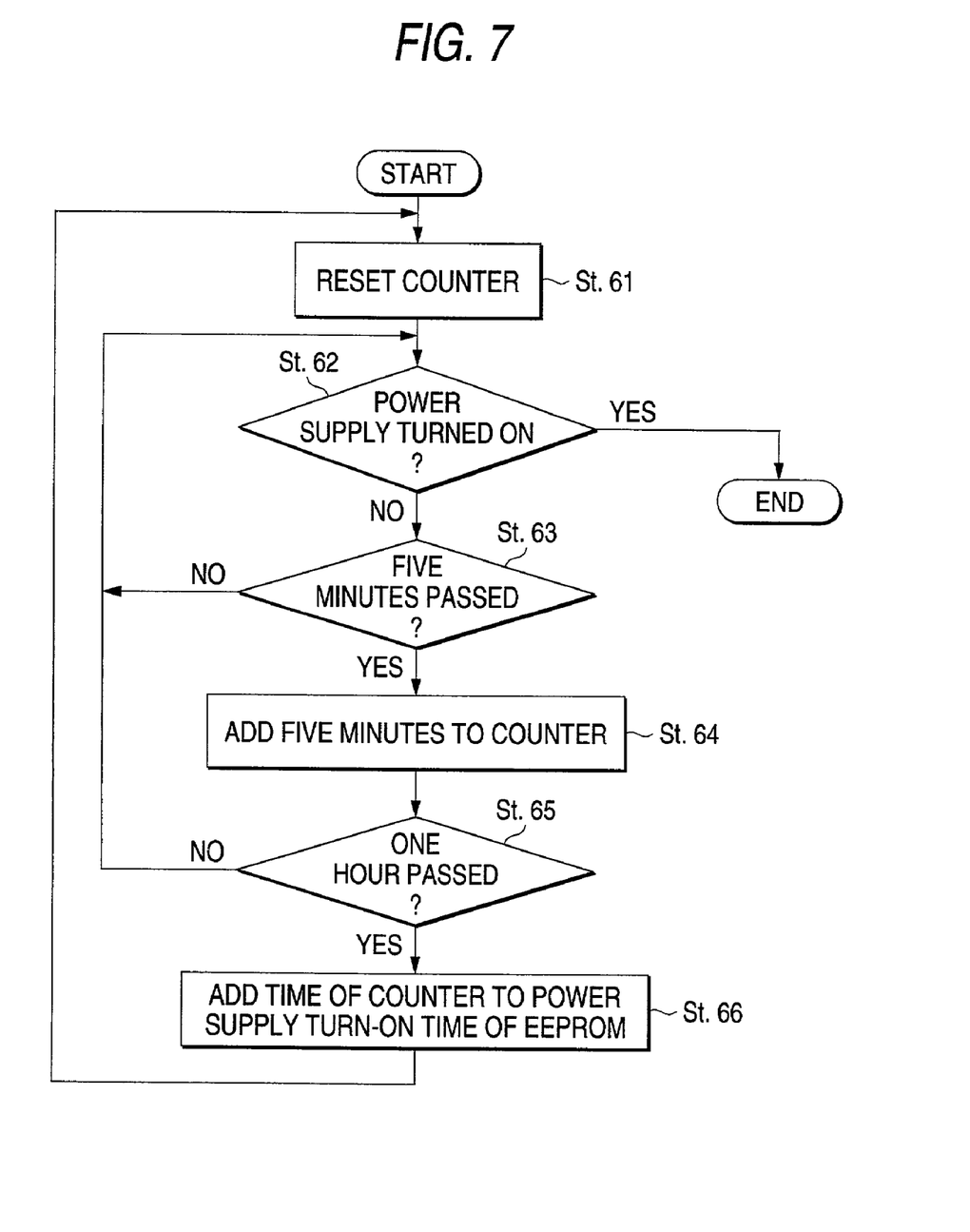
FIG. 7 is a flow chart showing the procedure of recording the history of the turn-on times of a power supply according to the embodiment.

FIG. 7 shows the operation procedure of the camera control unit 21 in the case of recording the turn-on times of the power supply.

Step 61: the counter 53 is reset.

Step 62: the recording operation is stopped immediately upon turn-off of the power supply.

Step 63: upon each lapse of five minutes, step 64: five minutes is added to the contents of the counter 53.

Step 65: upon each lapse of one hour, step 66: the time of the counter 53 is added to the power supply turn-on time recorded in the E²PROM 47. Then, the process returns to step 61 to reset the counter 53.

In this manner, the power supply turn-on time is counted by the counter 53 on a five-minute unit basis, and the counted time of the counter 53 is added to the recorded data of the E²PROM 47 at every interval of one hour. Thus, the accumulated value of the power supply turn-on time is recorded as the history with the time lag within one hour.

Figure 8:
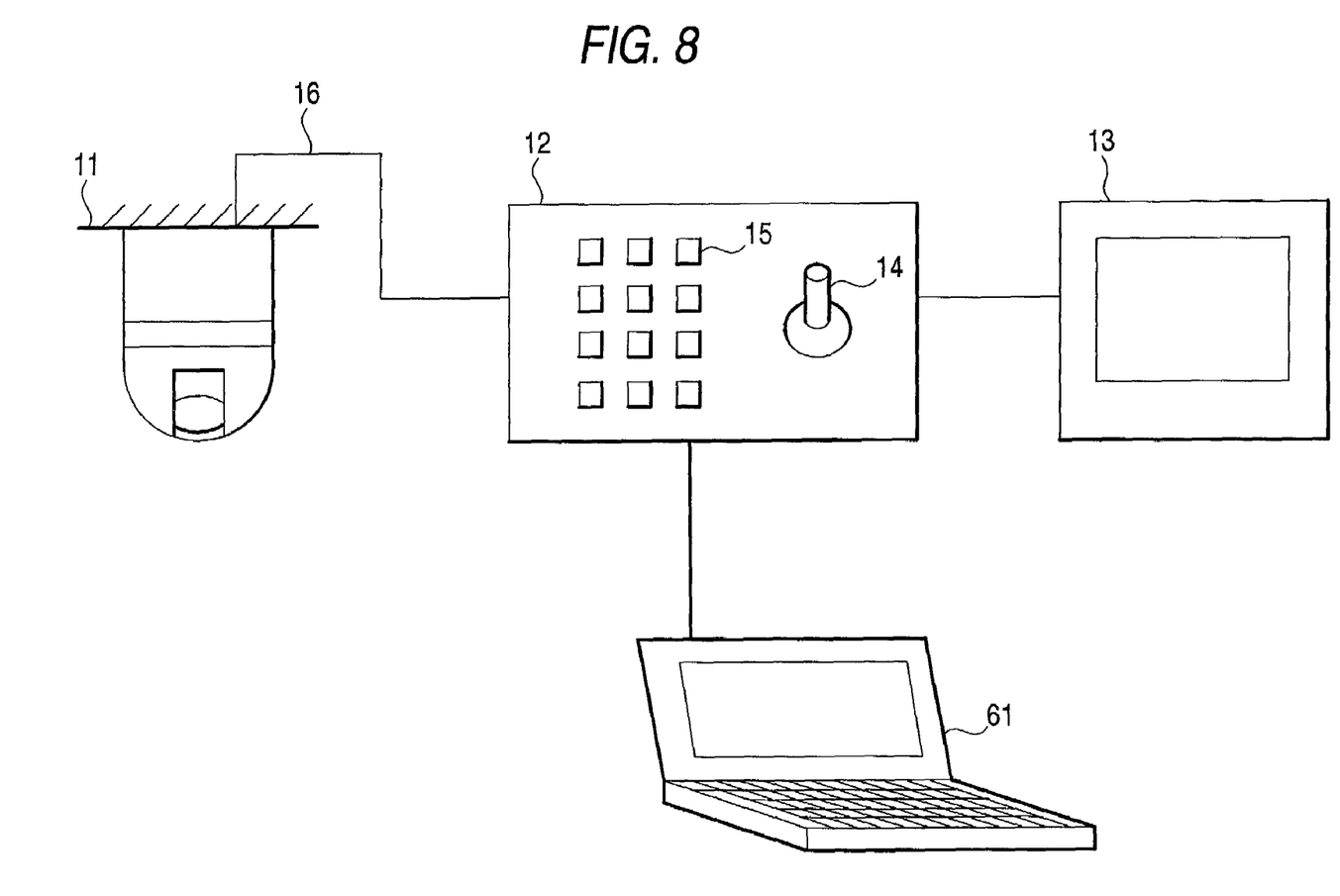
FIG. 8 is a diagram showing a state for reading the operation history of the composite camera according to the embodiment.

FIG. 8 is a diagram showing the status of reading the operation history recorded in the E² PROM 47 of the composite camera 11. A service man connects the terminal device 61 to the controller 12 and inputs a password etc. by means of the terminal device 61 to enter into a dedicated mode to thereby send a command for instructing the transmission of the operation history to the composite camera.

The camera control unit 21 of the composite camera 11 interprets the command to transfer the data recorded in the E²PROM 47, whereby this data is displayed on the terminal device 61. Thus, the service man can accurately estimate a cause of the failure etc. of the composite camera based on the operation history thus displayed.

Although the explanation has been made as to the case where the recorded data of the RAM is updated at every interval of five minutes and the recorded data of the E²PROM is updated at every interval of one hour, these interval times may be changed as the occasion demands. For example, the recorded data of the RAM may be updated at every interval of one minute and the recorded data of the E²PROM may be updated at every interval of thirty minutes.

Further, although, in the aforesaid embodiment, the explanation is made as to the composite camera which can perform the panning rotation of 360 degrees and the tilting rotation of 180 degrees, the invention is applicable to a surveillance camera having a pivot with at least one shaft.

INDUSTRIAL APPLICABILITY

As clear from the aforesaid explanation, the surveillance camera according to the invention can remain the operation history which supplies important information at the time of repairing.

Further, the data for the operation history can be collected efficiently without imposing a large load on the control mechanism within the surveillance camera.

The invention claimed is:

1. A surveillance camera apparatus comprising:
a surveillance camera,
a temporary storage means in the surveillance camera for recording a status amount of an operation of the surveillance camera at constant time intervals of a predetermined time span,
a storage means in the surveillance camera formed of a rewritable non-volatile memory for recording data, including operation history of the surveillance camera,
wherein the status amount recorded in said temporary storage means is recorded in said storage means as the operation history of the surveillance camera at constant time intervals of a predetermined time period which is longer than said predetermined time span.

2. A surveillance camera apparatus according to claim 1, wherein the storage means records an accumulated number of preset operations executed during the predetermined time period as the operation history.

3. A surveillance camera apparatus according to claim 1, wherein the storage means records an accumulated number of automatic panning operations executed during the second predetermined time period as the operation history.

4. A surveillance camera apparatus according to claim 1, further comprising a power supply for supplying power to the surveillance camera wherein the storage means records an accumulated turn-on time of a power supply executed during the predetermined time period as the operation history.

5. A surveillance camera apparatus according to claim 1, further comprising a filter changing unit, wherein the storage means records an accumulated number of filter changing unit operations for changing a filter of the camera executed during the predetermined time period as the operation history.

6. A surveillance camera apparatus according to claim 1, wherein the storage means records an accumulated number of coordinate system resetting operations for resetting coordinate data of the camera executed during the predetermined time period as the operation history.

7. A surveillance camera apparatus according to claim 1, further comprising an internal temperature sensor for obtaining a temperature within the surveillance camera, wherein the storage means records a maximum temperature and a minimum temperature within the camera obtained during the predetermined time period as the operation history.

* * * * *